United States Patent Office 2,849,317
Patented Aug. 26, 1958

2,849,317

AMENDMENT FOR LEGUME FEEDS

Artemy A. Horvath, Santa Fe, N. Mex.

No Drawing. Application October 5, 1955
Serial No. 538,797

2 Claims. (Cl. 99—2)

This invention relates to improvements in animal feeds, particularly for meals containing legumes such as alfalfa, clover or soybeans. These tend to induce bloat or other deleterious effects in animals. Bloat occurs in ruminant animals and horses but other harmful effects occur whether to ruminants or non-ruminants.

Undesirable ailments or growth inhibitions from ingestion of these plant feeds are well known. Hence description of this invention will proceed without detailed description of such plants nor of their limitations in animal feeding. Effects such as repressed growth as indicated in weights, weakened resistances, excessive stimulation of certain physiological functions, or bloat not only are harmful of themselves but they indicate nutritional disturbances of deeper nature.

The legumes mentioned are those most generally being used in animal feeding today. In some cases the plant itself is fed, whole or chopped or ground. In some cases the plant is dried and ground to meal; in other cases the seed is crushed or ground and fed as meal. These meals often are intermingled with other ground feeds. From all of these forms these legumes result in some of the digestive or growth disturbances known to those in the art.

This invention purposes combatting these ill effects of legume feeds by use of substances that may be ingested by the animal. In the digestive and absorptive processes of the animal the feed amendments of this invention counteract the ill effects of the legume. Evidence is that these amendments affect the permeabilities of cells involved in the nourishment processes of the animal. However, this invention is not restricted by any explanation. The fact is that substances, to be more fully illustrated, do counteract various restrictive or depressant consequences of legume feed. For the sake of brevity alfalfa may be taken as typical of these meals but such selection is not intended to be limiting, as ladino clover and other clovers act similarly and soybean oil meal also introduces physiological disturbances as problems of nourishment. The appended claims are intended to cover the use of the specified feed amendment to counteract ill effects of alfalfa meal and the like in animal nourishment and health.

This invention enhances the feed value of alfalfa, for example, by the use of comminuted leaves and twig growth of a plant known as creosote bush. Botanically this is designated as *Larrea tridenta,* or *Covillea glutinosa* or *Covillea tridenta.* For brevity in this application the leaves are named, but with intention to include the twig growth therewith. Further, this invention comprehends other substances with creosote bush leaf meal as counteracting amendments to legume meal feed.

As an example, this invention uses about 0.5% of dry creosote bush leaf meal in alfalfa meal. This composite when fed in cattle and to sheep avoids bloat, though the same alfalfa meal without the creosote bush leaf caused bloat. The same beneficial results follow even though this composite meal contain other components such as are usual in animal feeds. For example, such more complete feeds may contain grains, minerals, urea, vitamin additions, carbohydrates and other supplements. The preferred proportion of dry creosote bush leaf to alfalfa may vary under this invention to as low as 0.1% and as high as 2%, to indicate their order of magnitude, but the invention is not strictly limited to these figures in view of the large variances in toxicity of various alfalfa samples. As stated already, alfalfa in this description is typical of other legumes that depress nutrition and health in animals. Further, this creosote bush leaf meal amendment to alfalfa avoids the growth inhibiting effect of alfalfa feed for chickens and similar animals.

Use of creosote bush leaf meal under this invention involves bringing the dry comminuted leaf into intimate association with the alfalfa meal during digestion so that the two contact digestive fluids and body cells together. In practice this involves, preferably, embodying the two meals in one feed, whether at the feed mill or otherwise so that the animal digests the two components as one feed. The creosote bush leaf meal is quickly broken down in the presence of components from the alfalfa to modify the digestive and absorptive actions.

In this biochemical action it may be that the cells of the creosote bush leaf particles, fed as powder or meal, are attacked by the saponin of the legumes being fed, as to release counteracting reagents of relatively large molecular size through the cell walls. The agents thus quickly released bind the legume saponin in turn and in effect immobilize or divert it from attack on the cells of the animal in the gastro-intestinal tract. That is, the amendment meal of creosote bush leaf modifies action of the legume saponin. The legume saponin would have affected the colloidal arrangement and the membrane permeability of cells in the digestive system of the animal, for example the epithelium lining of the digestive tract. There is evidence that saponin tends to facilitate absorption of poisons into the animal system. Some such poisons may have been ingested by the animal in the feed ingredients, some may have been developed in the animal digestive system. But tendencies of saponin from these legumes to impair the normally protective cell permeability is counteracted by the meal of creosote bush leaf, particularly when intimately intermingled with the particles of alfalfa meal, soybean oil meal, clover or the like that carry the harmful components. However this may be, applicant is not committed to one or another theory. Creosote bush leaf meal counteracts tendencies of animals to bloat from these legumes, likewise counteracts kidney ailment, and counteracts tendencies of animals to grow more slowly when fed too much legume in many instances, as with fowls. This amendment is in effect a self-regulating control against varying amounts and kinds of insidious components of legume feed.

As an extension of this invention, to prevent alfalfa meal, clover meal or soybean oil meal from their inhibitory and toxic effects, is a composite meal of the legume-creosote bush mix and dried citrus pulp. A preferred range is about 0.1% to 1% of the citrus pulp meal to the stated legume-creosote bush mix. Citrus pulp meal contains about 2.5 to 5% fatty components in addition to 6% protein, 12 to 20% fibre and 50 to 65% nitrogen-free extract. This delays absorption of toxic products of the legume into the cells of the animal.

In accordance with the patent statutes this invention has been illustrated by examples of preferred practices to counteract untoward effects of legume meal feeds for animals. Consequently those skilled in the art will now recognize that departures may be made from the exactness of the examples given and that the appended claims extend to equivalents and variants of the features described and claimed.

What is claimed is:

1. An improved feed meal having properties of avoiding harmful effects of legumes, comprising comminuted particles selected from the group consisting of alfalfa, clover, and soybean oil meal, together with the order of 0.1% to 2% thereof of comminuted creosote bush leaf, the comminuted creosote bush leaf containing its natural alcohol-soluble components.

2. An improved feed meal having properties of avoiding harmful effects of legumes, comprising comminuted particles selected from the group consisting of alfalfa, clover and soybean oil meal, together with the order of 0.1% to 2% thereof of comminuted creosote bush leaf and the order of 0.1% to 1% thereof of citrus pulp meal, the comminuted creasote bush leaf containing its natural alcohol-soluble components.

References Cited in the file of this patent

Duisberg: Jr. Animal Science, 11 (1952), pp. 174–80.